(12) United States Patent
Waltermann et al.

(10) Patent No.: US 10,965,748 B2
(45) Date of Patent: Mar. 30, 2021

(54) CREATING AND USING DOCUMENT PEDIGREE DATA

(71) Applicant: Lenovo (Singapore) Pte. Ltd., Singapore (SG)

(72) Inventors: Rod D. Waltermann, Rougemont, NC (US); Hermann Franz Burgmeier, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 697 days.

(21) Appl. No.: 14/744,937

(22) Filed: Jun. 19, 2015

(65) Prior Publication Data

US 2016/0371343 A1    Dec. 22, 2016

(51) Int. Cl.
*H04L 29/08* (2006.01)
(52) U.S. Cl.
CPC ................................ *H04L 67/1097* (2013.01)
(58) Field of Classification Search
CPC .................................................. H04L 67/1097
See application file for complete search history.

(56) References Cited

U.S. PATENT DOCUMENTS

| 2009/0235163 | A1* | 9/2009 | Moriwaki | H04N 1/00212 715/256 |
| 2012/0173511 | A1* | 7/2012 | Eto | G06F 17/30091 707/711 |
| 2013/0007769 | A1* | 1/2013 | Alkov | G06F 11/3093 719/318 |
| 2013/0332430 | A1* | 12/2013 | Margalit | G06F 9/542 707/695 |
| 2016/0275101 | A1* | 9/2016 | Hinterbichler | G06F 17/30233 |

* cited by examiner

*Primary Examiner* — Apu M Mofiz
*Assistant Examiner* — Husam Turki Samara
(74) *Attorney, Agent, or Firm* — Ference & Associates LLC

(57) ABSTRACT

One embodiment provides a method including storing, in response to an event associated with a file, file identification data and event data for the file; creating, using a processor, a reference between the file, the file identification data, and the event data; and storing, in a catalog, the reference in association with the file; wherein the catalog includes an inter-application reference. Other aspects are described and claimed.

18 Claims, 3 Drawing Sheets

CREATING AND USING DOCUMENT PEDIGREE DATA

BACKGROUND

With an increase in a desire to have files accessible from any location, people may store files (e.g., documents, spreadsheets, applications, file folders, etc.) in multiple storage locations or may use remote storage locations that are accessible from different locations. For example, users may have cloud storage devices in which they may store files. Additionally, users may share files through multiple communication methods (e.g., email, text messaging, file share programs, etc.). However, due in part to these multiple storage locations and different methods of sharing files a user may have difficulty finding a file when desired, particularly if the file has gone through multiple revisions, has been handled by multiple application programs, and has been stored in multiple locations.

BRIEF SUMMARY

In summary, one aspect provides a method, comprising: storing, in response to an event associated with a file, file identification data and event data for the file; creating, using a processor, a reference between the file, the file identification data, and the event data; and storing, in a catalog, the reference in association with the file; wherein the catalog includes an inter-application reference.

Another aspect provides a system, comprising: a processor operatively connected to the storage location; a memory device that stores instructions executable by the processor to: store, in response an event associated with a file, file identification data and event data for the file; create a reference between the file, the file identification data, and the event data; and store, in a catalog, the reference in association with the file; wherein the catalog includes an inter-application reference.

A further aspect provides a product, comprising: a storage device that stores code executable by a processor, the code comprising: code that stores, in response to an event associated with a file, file identification data and event data for the file; code that creates a reference between the file, the file identification data, and the event data; and code that stores, in a catalog, the reference in association with the file; wherein the catalog includes an inter-application reference.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
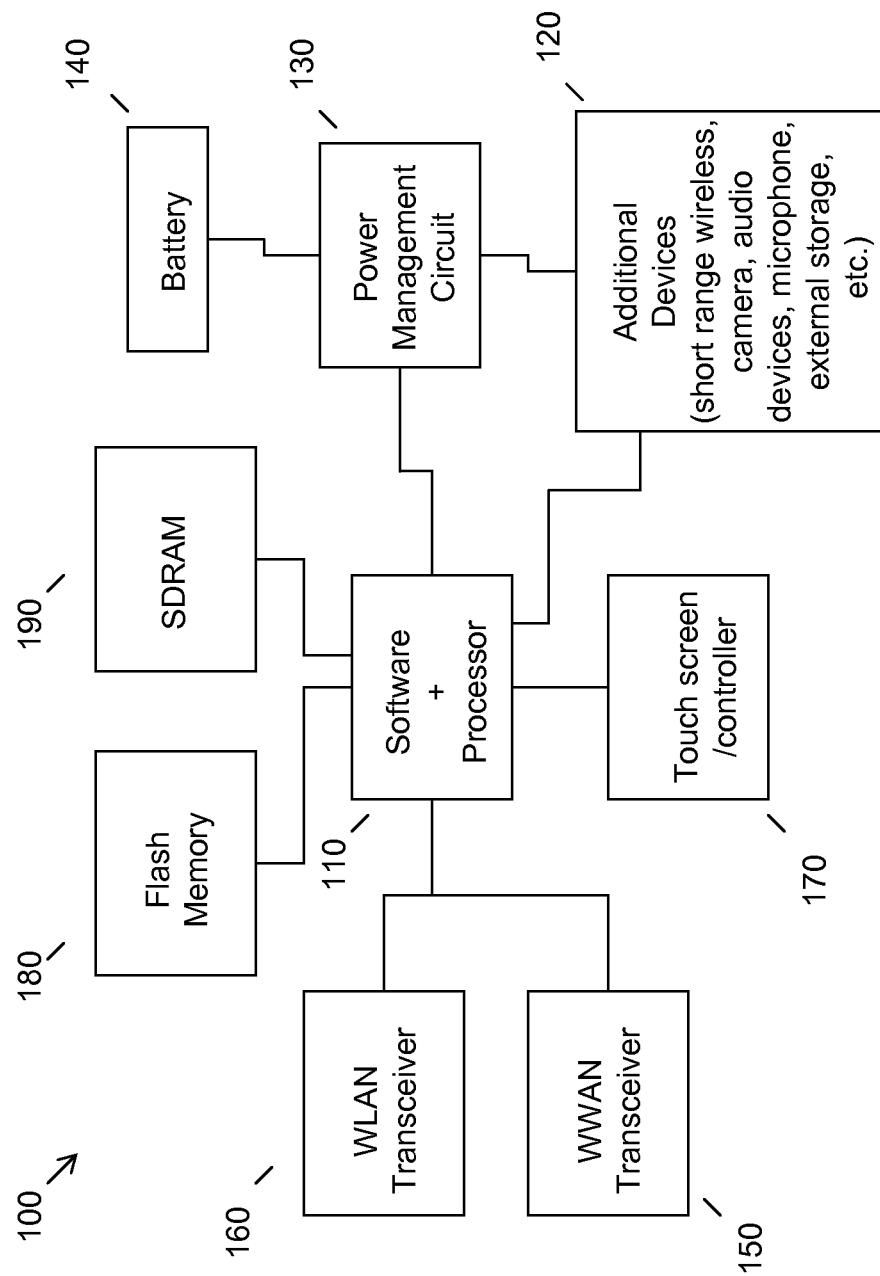
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Currently it is not easy to find a file (e.g., a document, picture, video, etc.) based on its pedigree. There is not a really good way to look for a file based on where it came from. For example, if a user wants to locate a file that was sent as an email attachment, the user can currently search for the email that someone sent, but that is only one degree of freedom. If the user doesn't remember who sent the email containing the file, the search may not provide the target file. Also if the user has detached the file from that email, that degree of freedom is lost with respect to the detached email. As most users have found, keyword searching using current techniques is very time consuming and inaccurate.

Current solutions offer various types of search features, but these tend to be limited in the ability to find a file. For example, a search feature in an explorer setting requires the user to remember the title or part of the title of the file. More advanced searching techniques allow a user to search the contents of the file, but without a detailed search phrase, this type of search can be very time consuming. Additionally, if a user does not remember which folder the file was saved within, the search may have to be expanded to include multiple file folders, which is even more time consuming.

Search features in email programs may allow a user more options when searching for an email, for example, through selections of email fields, such as "From:", "To:", "Date", and the like. However, some email programs automatically delete or archive emails after a certain time period, frequently 30 or 60 days, which frustrate searches for files or emails that were received or sent before the time period. Additionally, a user may be uncertain of certain search fields relating to the email which may make it difficult to define the search fields correctly. For example, a user may remember a person who was on the email chain, but may not remember if the person sent the email or was just a recipient of the email.

Another issue with file tracing arises when a user creates a new file containing pieces or parts of another or multiple other files. For example, when a user is creating a presentation or document, the user may use information from a variety of sources. The user may copy and paste portions of a file into the application containing the final file. However, usually once the portion of the file is moved or copied into the final file it is difficult to ascertain the originating location of the file or portion of the file.

In some cases, the different applications work together to create a link between the two files. However, this link is usually lost when the file is shared with an additional user. For example, a user may create a word processing document that contains a portion of a spreadsheet created in a spreadsheet application. The user may be able to open the spreadsheet from within the word processing document because both files are saved on the user's local machine. However, when the user emails the word processing document the link is broken because the file containing the original spreadsheet is not located on or accessible by the second user's device (e.g., tablet, personal computer, laptop computer, smart phone, smart TV, etc.).

These technical issues present problems for users in that finding a file can be difficult. Conventional methods for finding files require that a user know enough about the file to enter useful search terms. The less the user knows about the file, the more cumbersome and time consuming the search becomes. Additionally, tracing a file or portion of a file's origin to an originating document is almost impossible. This is especially true once the final file has been shared with other users. As such, a technical problem is found in that current file tracing techniques fail to allow a user to search for files using any information that the user may know, but rather restrict the user to search fields which may be difficult to define correctly. Additionally, current file tracing techniques fail to trace a file or portion of a file's origination location or file.

Accordingly, an embodiment leverages a two fold indexing solution that may be combined with a machine learning technique to allow a user to ask a question like "Where did I store the file that Tom forwarded to me from Bill?" and get an accurate answer. In a first indexing technique, an embodiment stores file identification data, e.g., an embodiment catalogs the files and a hash (or other technique) to determine if the file is the same (e.g., based on size), or has been changed. The file identification data may be referred to herein as catalog data. An embodiment uses a second indexing technique designed to capture file event data, e.g., logging data. Thus, as a file is written, read, saved, etc., a log entry with a time stamp and the application may be recorded. Machine learning may be applied to the data resulting from these two indexing techniques to create a pattern recognition solution that builds references between the events and the files.

This processing allows for a user to extract a file, e.g., from an email and as it is saved to the disk, events are created regarding its originating application (e.g., email), its destination (storage location), its manipulation (e.g., changes in size or version, if any) and the like. The first indexing solution thus may catalog the file's new location and whether it matches the email attachment that was received from a particular user in a particular email client application. As this data is processed through the learning system, relationships are formed, e.g., between the email application that saved the file and the catalog location.

By way of example, if a user then moves this file to cloud storage, again this creates a write event that triggers the above solution process the event data and store indexing or cataloging data again. As the new data is passed through the learning solution, the pattern recognition triggers a match (e.g., hash, given file size, or other attributes), and the path data is added to the chain of flow for that file, thus creating a pedigree for the document that may be used later, e.g., in a search tool to retrieve the document using pedigree data as the search input. Thus, a user may search on the basis of pedigree data that is easier and more natural for the user to remember, rather than entering conventional parameters (e.g., received from, sent to, date ranges, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio input device such as a microphone. System 100 often includes a touch screen 170 for data input and display/rendering. System 100 also typically includes various memory devices, for example flash memory 180 and SDRAM 190.

Figure 2:
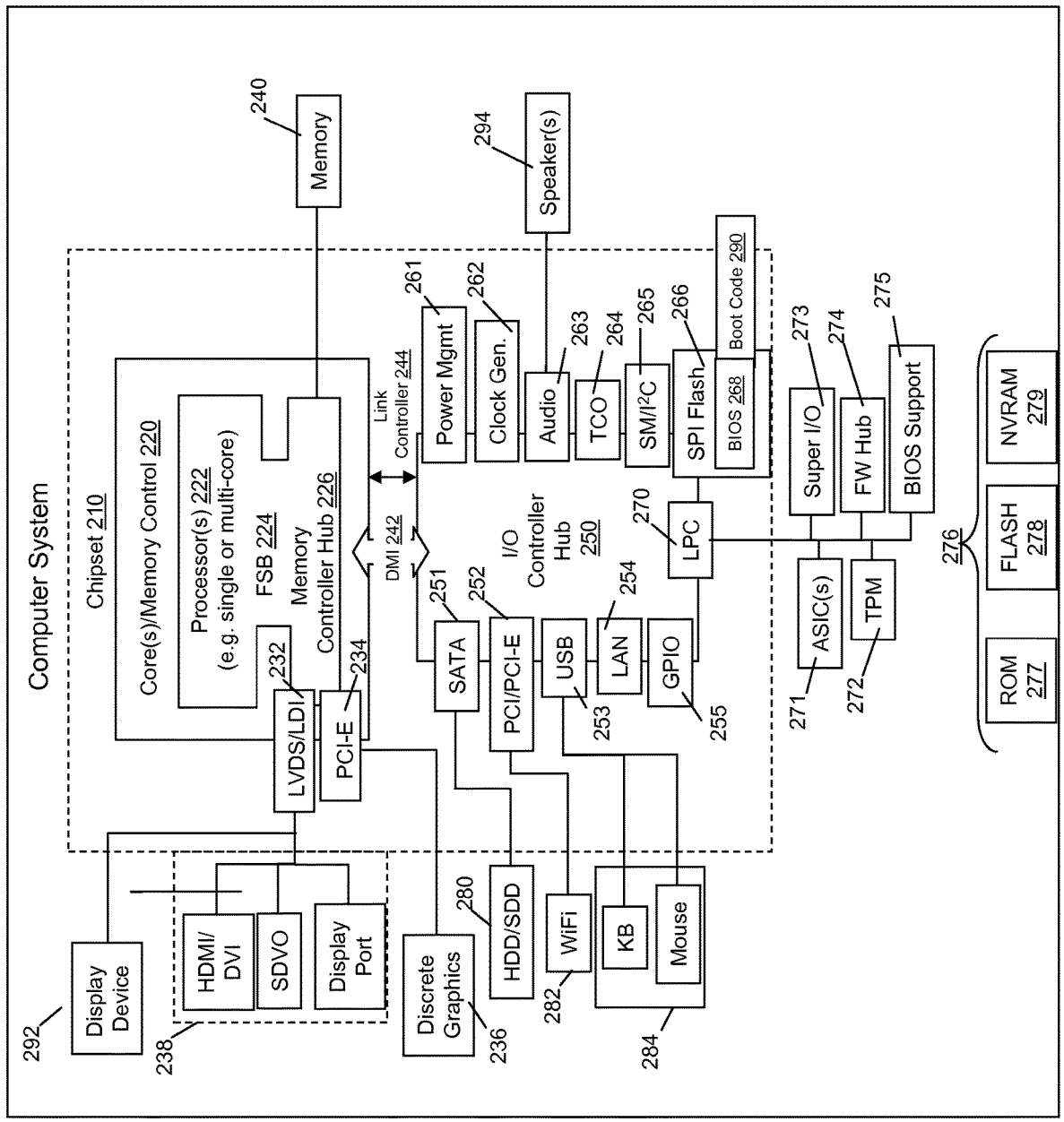
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mouse, camera, phone, microphone, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to save, create, open, or otherwise manipulate files. Additionally or alternatively, the devices as outlined in FIG. 1 or FIG. 2 may be used to store data associated with manipulation of a file. For example, the circuitry outlined in FIG. 1 may be implemented in a tablet or smart phone embodiment, whereas the circuitry outlined in FIG. 2 may be implemented in a personal computer embodiment or circuitry such as that outlined in FIG. 1 and/or FIG. 2 may be used in a cloud service device or devices.

Figure 3:
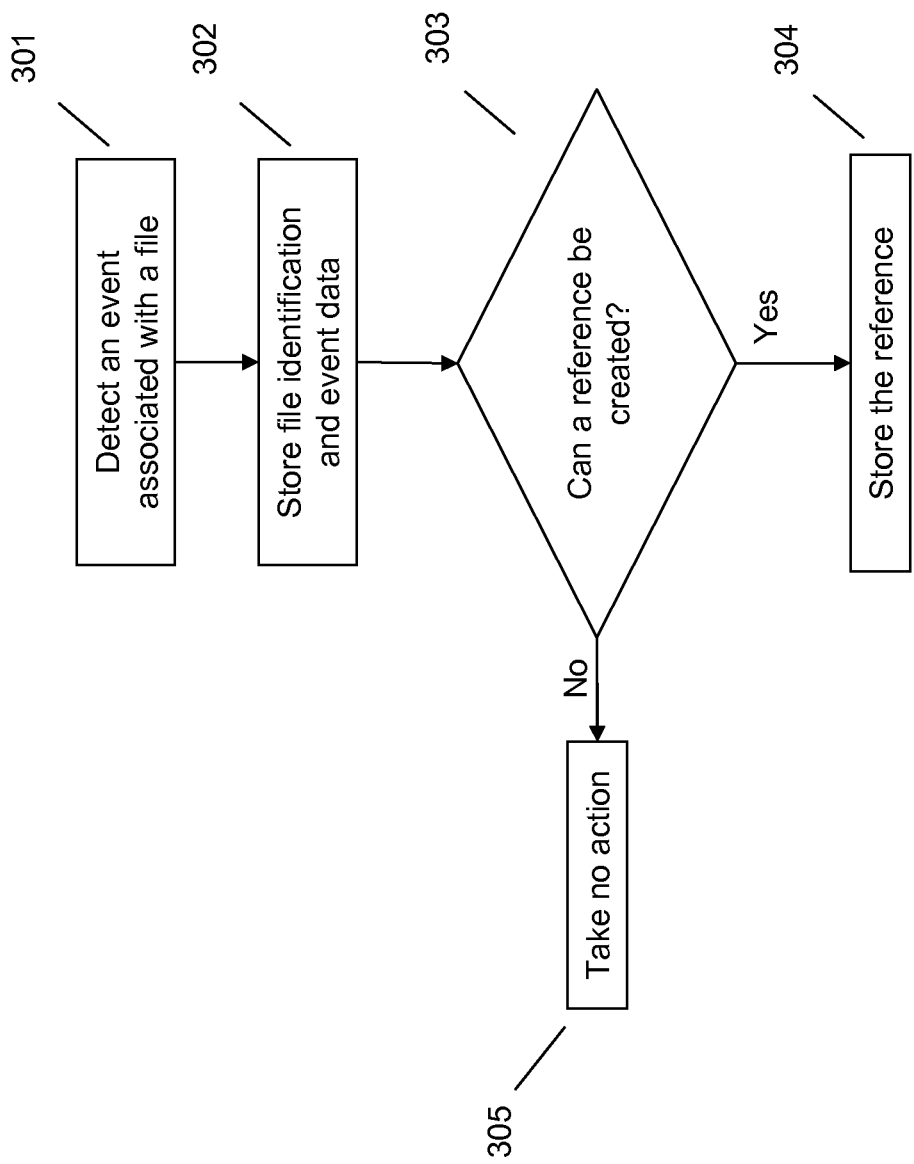
FIG. 3 illustrates an example method of creating and using document pedigree data.

Referring now to FIG. 3, at 301, an embodiment may detect an event associated with a file. This event may comprise a file write event, a file read event, or a file manipulation event (e.g., cut, paste, copy, move, open, read, save, etc.) of at least a portion of the file or it may include a manipulation of the entire file. For example, a user may open or choose a location to save an attachment to a communication. As another example, a user may copy a portion of a file.

In response to this event, an embodiment, at 302, may store file identification data and event data. The file identification data may include unique information used for identifying the file (e.g., a hash, file size, file name, author, time stamp, etc.). Storing the file identification data and event data may include storing the information in a remote, local, removable, or other storage location, also referred to herein as a catalog. The catalog may be distributed between devices. For example, the data may be stored in a cloud storage device. Alternatively or additionally, the data may be stored locally. Saving the data in a local storage location may include storing the data on the user's local device or may include storing the reference within the file itself. For example, if a user moves a file from one location to another, data including the original location of the file may be attached to the file upon its move to the second location. If the data is stored in a location not attached to the file, a pointer to the data may be included with the file. As an example, if the data is stored in a remote storage location, the file may include a link or other type of pointer which indicates where the data can be accessed from.

The file identification data may be associated with a first indexing method in one embodiment in which the file is cataloged and a designation of whether the file has changed from the original file, for example, through the use of a hash or other indicator. In other words, this file identification data may include information related to the file, for example, file name, file size, file location, author, and the like, rather than what event occurred. For example, if an attachment is saved from an email, this indexing method may save information relating to the file, such as file name, author, the file location, file size, and the like, and whether the file saved is the same file that was attached to the email.

The event data may be associated with a second indexing method which may be designed to log I/O events. In other words, this information may be information relating to the event that was detected rather than just the file. For example, the information may include information such as what manipulation was performed, the time stamp associated with the event, the application in which the event occurred, and other such information. In other words, the file identification data and event data created may include any information which may be useful to a user in finding the file or determining the origination of the file or portion of the file at a later time.

At 303, an embodiment may attempt to create a reference between the file, file identification data, and event data. This reference may include creating a link or pointer between the file and the stored data. In one embodiment, this reference may include associating the event, the event data, the file identification data, and the file. In other words, the reference created gives a path for tracing the file's pedigree. For example, if a user has received an email with a presentation attachment. The user may then save this attachment to a local storage location. Upon saving this attachment, an embodiment stores data associated with the file and the save event. An embodiment then creates a reference between the file and the associated data. When the user later accesses the file, the user can access the file pedigree to determine where the file originated.

As another example, a user may create a word processing document with a portion of a spreadsheet from another application. Upon copying and pasting the spreadsheet portion into the word processing document, an embodiment stores data associated with the portion of the spreadsheet and the copy/paste event. An embodiment then creates a reference between the file, the file identification data, and event data, thereby creating a link between the final file and the originating file. When the user emails the final word processing document to a recipient, the recipient can select the portion of the spreadsheet and the created reference may access the data associated with that spreadsheet portion. This may allow the second user to see where that spreadsheet information came from.

If at 303, the creation of the reference is unsuccessful, an embodiment may take no further action at 305. If, however, the creation of the reference is successful, an embodiment may store the reference in a catalog at 304. While the catalog may include references for all events that occur in association with a file, the catalog may also include an inter-application reference. For example, the catalog may include a reference of events occurring to the file between different applications, rather than only a reference of events occurring within the same application. The reference may be saved in a storage location which may include a local storage location, a remote storage location, a removable storage location, or any other storage location.

In one embodiment, the reference may be associated with the file. This may allow a user to access the reference and thereby access the data to determine where the file is currently saved or where the file originated from or other desirable information. Depending on the type of manipulation, the associating of the reference with the file may include associating the reference with one or more files. For example, if a user is simply moving a single file from one location to another, the reference may be associated with just that file. If however, a user is copying and pasting a file or portion of a file from one file to another, the reference may be associated with both files, only the first file, or only the second file.

Once the reference is saved and associated with a file or multiple files, an embodiment may provide access to the reference and thereby access to the data upon manipulating the file. For example, if the reference/data is associated with a first file and the user then opens that file, the data may now be accessible to the user. Providing access to the data may include allowing the user to actually view the data, providing a link to the data, allowing a user to copy the data, or other type of access. Additionally, access to the data may just comprise providing access to the information handling device. For example, if a user is searching for a particular file and has provided information regarding that file, the information handling device may access the data store to perform the requested search.

One embodiment may further detect a second event associated with the file. This second event may include a change or manipulation to the file. In one embodiment, the second event may comprise a manipulation of at least a portion of the file. In one embodiment, the detection of the second event may include detecting the second event occurring within another file. For example, if a user copies a portion of a webpage and copies that portion to a word processing document, the second event would be the copying into the word processing document. Upon detection of this second event, an embodiment may create file identification data, event data, and a reference for the changed file, using a similar method to that described above. An embodiment may further create a reference between the original file and the changed file.

For example, if a user saves a word processing document, the catalog and event data may be stored in response to this event. A reference may then be created, which may associate the file with the save event and the catalog and event data created. If, at a later time, the user copies a portion of this word processing document to a presentation, catalog and event data may be stored in association with this file and copy event. If, at a later time, a user accesses the presentation the user would be able to use the created reference to determine what word document the portion of text came from, whether the text was modified from the original word processing document, and additionally would be able to determine when the original word processing document was saved.

One embodiment may receive a search query for a file. For example, a user may use an audio input device, such as a microphone, to ask the information handling device "where is the presentation that Bob sent me a couple months ago?" An embodiment may then use this search query information to access the reference for a file. In the case that multiple references exist for the file, an embodiment may access one or more than one of those references. Using the search query terms, an embodiment may then return the file(s) matching the search query.

The various embodiment described herein thus represent a technical improvement to file searching and tracing techniques. Using the techniques described herein, a user can search for a file efficiently even without knowing exact details of the file that would be required using conventional searching techniques. This helps reduce the amount of time and difficulty in finding a particular file. Additionally, using the techniques described herein a user can be provided with a method for tracing the pedigree of a file or portions of a file which may be included in a final file.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    storing, in response to a first event associated with a file, file identification data and event data for the file using a first indexing method, wherein the event data comprises information identifying an application corresponding to the first event and a designation of the first event, wherein the first indexing method catalogs the file identification data and the event data;
    creating, using a processor, a first reference comprising a link between the file and the stored file identification data and the event data, wherein the creating comprises providing path data within a link, wherein the path data creates pedigree for the file based upon the references, wherein the pedigree describes a chain of flow for the file;
    detecting a second event associated with the file, wherein the second event comprises a manipulation of at least a portion of the file identified via logging data;
    creating, using a processor and utilizing a second indexing method that captures the manipulation, a second reference for the changed file comprising a link between the file, the stored identification data, and second event data corresponding to the second event, wherein the creating a second reference comprises further creating a reference between the changed file and the file;
    storing, in a catalog, at least the second reference in association with the file, wherein the storing comprises storing at least the captured data associated with the manipulation of the at last one portion of the file;
    wherein the catalog includes an inter-application reference, wherein the inter-application reference comprises a reference of a plurality of events occurring to the file within one or more different applications, wherein the inter-application reference is built utilizing a pattern recognition technique that is generated via a machine-learning technique applied to the first reference and the second reference;
    receiving, from a user, a search query comprising at least one search term, wherein the at least one search term does not include the file identification data; and
    returning, in response to the received search query, at least one file related to the search query by accessing the catalog and searching at least one reference stored in the catalog using the at least one search term.

2. The method of claim 1, wherein the file identification data is selected from the group consisting of a hash, a file size, and a file name.

3. The method of claim 1, wherein the event data is selected from the group consisting of a time stamp, user data, and application data.

4. The method of claim 1, wherein the event data is selected from the group consisting of file write event data, file read event data, and file manipulation event data.

5. The method of claim 1, wherein the reference comprises an inter-application reference associated with the event.

6. The method of claim 1, further comprising creating file identification data, event data, and a reference for the changed file.

7. The method of claim 1, wherein the catalog is a distributed catalog.

8. The method of claim 1, wherein the received search query comprises a request for a file;
    accessing at least one reference for the file within the catalog; and
    returning one or more files associated with the reference.

9. The method of claim 1, wherein the catalog is stored in a cloud storage location.

10. A system, comprising:
    a processor operatively connected to the storage location;
    a memory device that stores instructions executable by the processor to:
    store, in response a first event associated with a file, file identification data and event data for the file using a first indexing method, wherein the event data comprises information identifying an application corresponding to the first event and a designation of the first event, wherein the first indexing method catalogs the file identification data and the event data;
    create a first reference comprising a link between the file and the stored file identification data and the event data, wherein the creating comprises providing path data within a link, wherein the path data creates pedigree for the file based upon the references, wherein the pedigree describes a chain of flow for the file;
    detect a second event associated with the file, wherein the second event comprises a manipulation of at least a portion of the file identified via logging data;

create, using a processor and utilizing a second indexing method that captures the manipulation, a second reference for the changed file comprising a link between the file, the stored identification data, and second event data corresponding to the second event, wherein the creating a second reference comprises further creating a reference between the changed file and the file;

store, in a catalog, at least the second reference in association with the file, wherein the storing comprises storing at least the captured data associated with the manipulation of the at last one portion of the file;

wherein the catalog includes an inter-application reference, wherein the inter-application reference comprises a reference of a plurality of events occurring to the file within one or more different applications, wherein the inter-application reference is built utilizing a pattern recognition technique that is generated via a machine-learning technique applied to the first reference and the second reference;

receive, from a user, a search query comprising at least one search term, wherein the at least one search term does not include the file identification data; and return, in response to the received search query, at least one file related to the search query by accessing the catalog and searching at least one reference stored in the catalog using the at least one search term.

11. The system of claim 10, wherein the file identification data is selected from the group consisting of: a hash, a file size, and a file name.

12. The system of claim 10, wherein the event data is selected from the group consisting of: a time stamp, user data, and application data.

13. The system of claim 10, wherein the event data is selected from the group consisting of: file write event data, file read event data, and file manipulation event data.

14. The system of claim 10, wherein the reference comprises an inter-application reference associated with the event.

15. The system of claim 10, wherein the instructions are further executable by the processor to create file identification data, event data, and a reference for the changed file.

16. The system of claim 10, wherein the catalog is distributed catalog.

17. The system of claim 10, wherein the received search query comprises a request for a file;
    access at least one reference for the file within the catalog; and
    return one or more files associated with the reference.

18. A product, comprising:
a storage device that stores code executable by a processor, the code comprising:
code that stores, in response to a first event associated with a file, file identification data and event data for the file using a first indexing method, wherein the event data comprises information identifying an application corresponding to the first event and a designation of the first event, wherein the first indexing method catalogs the file identification data and the event data;
code that creates a first reference comprising a link between the file and the stored file identification data and the event data, wherein the creating comprises providing path data to a link, wherein the path data creates pedigree for the file based upon the references, wherein the pedigree describes a chain of flow for the file;
code that detects a second event associated with the file, wherein the second event comprises a manipulation of at least a portion of the file identified via logging data;
code that creates, using a processor and utilizing a second indexing method that captures the manipulation, a second reference for the changed file comprising a link between the file, the stored identification data, and second event data corresponding to the second event, wherein the creating a second reference comprises further creating a reference between the changed file and the file;
code that stores, in a catalog, at least the second reference in association with the file;
wherein the catalog includes an inter-application reference, wherein the inter-application reference comprises a reference of a plurality of events occurring to the file within one or more different applications, wherein the inter-application reference is built utilizing a pattern recognition technique that is generated via a machine-learning technique applied to the first reference and the second reference;
code that receives, from a user, a search query comprising at least one search term, wherein the at least one search term does not include the file identification data; and
code that returns, in response to the received search query, at least one file related to the search query by accessing the catalog and searching at least one reference stored in the catalog using the at least one search term, wherein the code that returns the at least one file related to the search query comprises utilizing the machine learning techniques associated with each indexing solution to create a pattern recognition solution between the events and the files.

\* \* \* \* \*